United States Patent [19]
MacMillan

[11] 3,909,906
[45] Oct. 7, 1975

[54] METHOD OF MAINTAINING PROPER ROTATIONAL CHARACTERISTICS OF A RADIAL TIRE

[76] Inventor: Kenneth T. MacMillan, 4992 Wesleyan Woods Drive, Macon, Ga. 31204

[22] Filed: Mar. 8, 1974

[21] Appl. No.: 449,533

[52] U.S. Cl................. 29/407; 152/330 R; 152/353
[51] Int. Cl.².......................................... B23Q 17/00
[58] Field of Search............ 29/407; 152/330 R, 353, 152/354; 40/129, 61

[56] References Cited
UNITED STATES PATENTS

| | | | |
|---|---|---|---|
| 999,157 | 7/1911 | Eckrode............................ | 40/129 B |
| 2,985,216 | 5/1961 | Williams et al.................. | 152/330 R |
| 3,155,135 | 11/1964 | Klenk................................ | 152/353 |
| 3,363,660 | 1/1968 | Mirtain et al..................... | 152/353 |
| 3,421,566 | 1/1969 | Sidles et al....................... | 152/330 R |
| R26,713 | 11/1969 | Mirtain et al..................... | 152/353 |

FOREIGN PATENTS OR APPLICATIONS

| | | | |
|---|---|---|---|
| 5,638 | 11/1907 | United Kingdom................ | 40/61 R |

Primary Examiner—Victor A. DiPalma
Attorney, Agent, or Firm—Diller, Brown, Ramik & Wight

[57] ABSTRACT

This disclosure is directed to a method of maintaining proper rotational characteristics of a radial tire by providing a radial tire having upon at least one side wall thereof indicia means capable of indicating both potential clockwise and counterclockwise rotation of the tire as viewed from the side of the vehicle upon which the tire is adapted to be mounted, and mounting the tire upon a vehicle such that the indicia means indicates only the actual direction of rotation of the tire, again as viewed from the side of the vehicle upon which the tire is mounted, whereby the initial direction of rotation of the tire will remain known for the lifetime thereof. The mounting step may or may not include an alteration of the indicia means, and the indicia means may be, for example, oppositely directed arrows, at least the letters CC, the letters L and R, or equivalents thereof.

14 Claims, 5 Drawing Figures

METHOD OF MAINTAINING PROPER ROTATIONAL CHARACTERISTICS OF A RADIAL TIRE

For many years, vehicle tires were rotated across in any particular sequence without subsequent adverse effects relative to wear, ridability, or the like. Such regular fabric tires could be rotated but such is not the case with respect to radial tires which are, of course, becoming more and more popular. Many manufacturers advise that their radial tires be changed only between front and rear which precludes crossing of the tires and changing the direction of original tire rotation. That is, assuming that a vehicle has two front radial tires and two rear radial tires, the tires on the left side as viewed from the left would normally rotate during the forward progress of the automobile in a counterclockwise direction whereas the tires on the right hand side of the automobile as viewed from the latter side would rotate in a clockwise direction. Thus if the right front tire were to be exchanged for the left rear tire both tires would be thereafter subject to opposite rotation than that initially subject to during the further driving of the vehicle. Such change in radial tire rotation is not only disadvantageous but it is also dangerous and stems from a change in the flex or set of the tire from the direction of rotation initially driven. Any such cross changing causes problems, such as radial belt lifting and the like and obviously since crossing the tires cannot be done there is no way that one can utilize a radial spare tire to get equal wear on all five tires. For this reason, two tires will generally wear out before the other three.

Another difficulty is that of properly remounting radial tires upon a vehicle after the tires have been retreaded. Once again assuming that a vehicle with four relatively worn radial tires thereon is brought to a retread service center it will be apparent that without highly precautionary measures the four radial tires which are removed from the vehicle (with or without the spare) and thereafter retreaded might well not be remounted upon the vehicle such that their original direction of rotation will be maintained the same. The odds are that such would not be the case and for the most part retreaders disdain even the thought of recapping radial tires.

In view of the foregoing, it is a primary object of this invention to provide a novel method of maintaining proper rotational characteristics of a radial tire by first providing a radial tire having upon at least one side wall thereof indicia means capable of indicating both potential clockwise and counterclockwise rotation of the tire as viewed from the side of the vehicle upon which the tire is adapted to be mounted, and mounting the tire upon a vehicle such that the indicia means indicates only the actual (or initial) direction of rotation of the tire as viewed from the side of the vehicle upon which the tire is mounted whereby the initial direction of rotation of the tire will remain known for the lifetime thereof irrespective of multiple mountings and/or demountings thereof.

The first-mentioned object is achieved by performing the mounting step to either (1) perform an alteration of the indicia means to indicate only the actual direction of rotation of the tire or (2) perform the mounting step without any alteration of the indicia means to similarly indicate only the actual direction of rotation of the tire.

Still another object of this invention is to provide a novel method of the type heretofore described wherein the indicia means are oppositely directed arrows, include at least the letters C, C, include the letters L and R, or equivalents thereof.

Another object of this invention is to perform the novel method described particularly incident to a recapping operation in which the step of providing a radial tire is performed by selecting a radial tire for recapping which is known to have rotated in an initial direction of rotation relative to an associated vehicle, the tire having upon at least one side wall thereof indicia means capable of indicating at least one of potential clockwise and counterclockwise directions of rotation of the tire as viewed from the side of the vehicle upon which the tire is adapted to be mounted, recapping the selected tire, and remounting the tire upon a vehicle such that the indicia means indicates only the initial direction of rotation of the tire again as viewed from the side of the vehicle upon which the tire is mounted whereby the initial direction of rotation of the tire will remain known for the lifetime thereof irrespective of multiple mountings and/or demountings thereof.

Yet another object of this inventon is to provide a novel method of the type latter-described wherein the remounting step may include or exclude the alteration of the indicia means, and in the case of the performance of the alteration step the same is performed after the selecting step and prior to the recapping step.

With the above and other objects in view that will hereinafter appear, the nature of the invention will be more clearly understood by reference to the following detailed description, the appended claims and the several views illustrated in the accompanying drawing.

IN THE DRAWING

Figure 2:
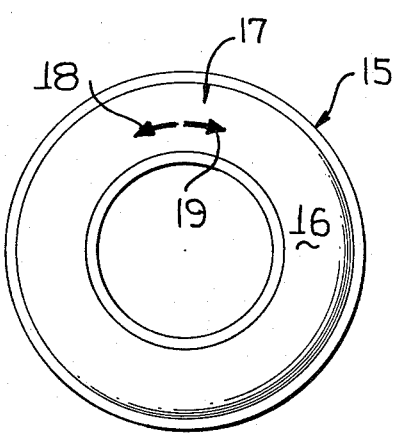
FIG. 2 is a sectional view taken generally along lines 2—2 of FIG. 1, and illustrates one embodiment of the invention wherein indicia means are applied to the spare radial tire as well as to the four tires mounted for rotation upon the vehicle of FIG. 1.
Figure 3:
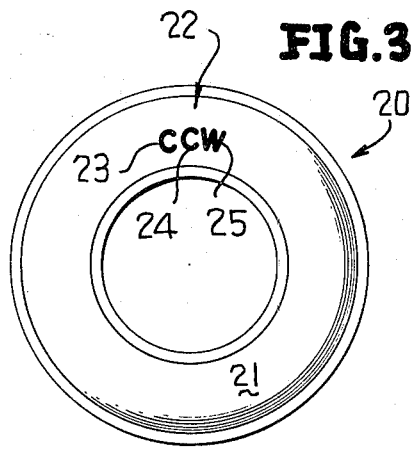
Figure 4:
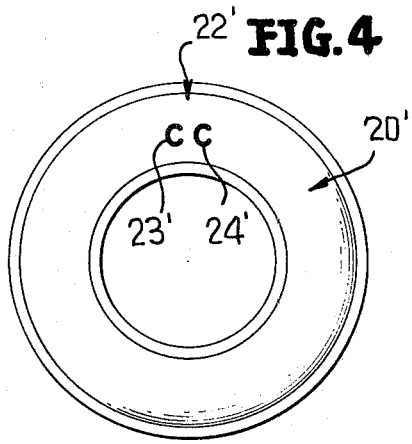
Figure 5:
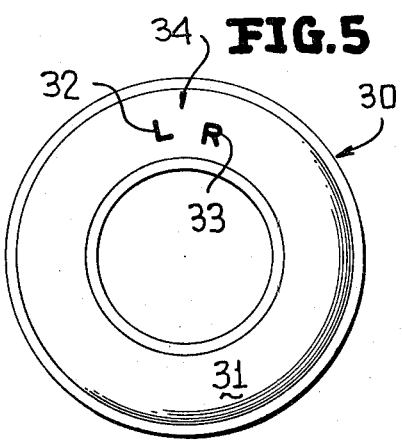

FIGS. 3, 4 and 5 of the drawings are views similar to FIG. 2, and each illustrates further indicia means indicating both potential clockwise and counterclockwise rotation of the tires involved.

The method of this invention will be described in conjunction with a vehicle 10 diagrammatically illustrated in FIG. 1 of the drawing which includes a frame F and conventional suspension systems such that the vehicle 10 has mounted for rotation relative thereto four radial tires 11 through 14 with a radial tire spare 15 being suitably carried by the vehicle 10 as, for example, toward the REAR of the vehicle 10. It is assumed that motion of the vehicle 10 is FORWARD as is indicated by the double headed arrow in FIG. 1, although the various directions are simply relative in order to more clearly define the present invention.

Each of the radial tires 11 through 15 has at least one side wall 16 provided with indicia means 17 (FIG. 2) capable of indicating both potential clockwise and counterclockwise rotation of the tire as viewed from the side of the vehicle upon which the tire is adapted to be mounted or is actually mounted thereupon. In the case of the present embodiment of the invention each side wall 16 of each of the tires 11 through 15 has as its indicia means a double-headed arrow indicating the direction of rotation by the reference numerals 18, 19 which in FIG. 2 represents respective counterclockwise and clockwise rotation of the tire, though the tire 15 has, of course, been described as a spare tire which is not theoretically rotated at the present instant of this description.

Assuming that the tires 11 through 15 were placed upon the vehicle 10 at the factory the side wall 16 of each tire 11 through 14 would face outboard of the vehicle 10 to be exposed for observation from the side as indicated by the headed arrows A through D whereas preferably though not necessarily the indicia 17 on the side wall 16 of the spare tire 15 would face rearward for exposure along a line of sight E. At this point various alternatives are available in keeping with the present invention:

In keeping with alternative one, the indicia 17 on all four tires 11 through 14 remains unaltered. The vehicle 10 may then be driven until, for example, it is desired to rotate the tires due to wear. If the tires 12 and 14 are merely substituted for each other and the tires 11 and 13 are substituted for each other, then again the indicia 17 may remain unaltered as the shifting of the FORWARD to REAR and vice versa in no way effects the direction of rotation as viewed along the view lines A through D. In other words, with this changed the tires 11, 13 rotate counterclockwise as is viewed along the view lines A and/or C whereas the tires 12, 14 rotate clockwise as viewed along the view lines B and/or D.

If, however, it is desired to substitute the spare radial tire 15 for whichever one of the tires 11 through 14 is most noticeably worn then an alteration in the indicia means of both the spare tire to be mounted upon the vehicle 10 and the tire to be removed therefrom is suggested. Assuming that the tire 11 is excessively worn, this tire is removed and the portion 19 of the indicia means 17 thereof is obliterated by, for example, suitably buffing down the side wall which leaves only the portion 18 of the indicia means 17 indicating that the rotation of the tire 11 prior to its removal from the vehicle 10 was in a counterclockwise direction as viewed from the line of sight A or the equivalent line of sight C. If the tire 11 were now replaced for the tire 15 as the spare when once again taken from the rear of the vehicle 10 the remaining portion 18 of the indicia means 17 of the tire 11 would indicate that it could only be placed upon the left side of the vehicle 10 as viewed in FIG. 1 since if placed on the right side as viewed from the right in FIG. 1 the remaining portion 18 of the indicia means 17 would indicate counterclockwise rotation. The spare 15 at this point still has both portions 18, 19 of the indicia means 17 thereupon and as such would be placed in the position of illustrated tire 11 with the side walls 16 of the tire 15 exposed for view along view line A. Therefore, at this point all four tires 12 through 15 have the entire indicia means 17 thereon whereas the spare tire 11 has the portion 19 of its indicia means 17 removed. Therefore, except for the status of the new spare tire 11, the remaining four tires 12 through 15 have both portions 18 and 19 of the indicia means 17 thereupon.

It will now be assumed that the wear of the tires is such that at least the tires 13 and 14 are to be recapped. Preferably, though not necessarily prior to the recapping operation the portion 19 of the indicia means 17 of the radial tire 13 is removed, once again as by an abrading or roughing process whereas the portion 18 of the indicia means 17 of the radial tire 14 is similarly removed. When thus removed the tires 13, 14 have only thereupon the respectively remaining portions 18, 19 of their respective indicia means 17 indicating that the tires are rotated predominantly in counterclockwise and clockwise directions forwardly as viewed along the sight lines C, D, respectively, of FIG. 1. Once the tires 13, 14 are recapped the remaining portions of the indicia means 18, 19 thereupon clearly indicate that these tires must be remounted on the respective left and right sides of the vehicle either to their original position or on the same side but to be substituted for the tires at the FORWARD end of the vehicle end 10.

As another embodiment of this invention it can be assumed that the four tires 11 through 14 as originally mounted on the vehicle 10 at the factory had the indicia means 17 altered to indicate clockwise rotation of the tires 12, 14 by the removal of the portion 18 of the indicia 17 therefrom and to likewise indicate counterclockwise rotation of the tires 11, 13 by the removal of the portion 19 of the indicia 17 therefrom. Thus the automobile as it leaves the factory has all four tires which will be initially road engaging provided with the direction of rotation thereof, whereas the spare tire 15 would be unaltered and would include both portions 18, 19 of the indicia means 17.

As a third alternative only the spare tire 15 as it leaves the factory would be provided with both portions 18, 19 of the indicia 17 upon the side wall 16 thereof. The tires 11, 13 would be provided only with the indicia portion 18 (not the indicia portion 19) whereas the opposite would be true for the tires 14, 12. Thus the direction of initial rotation (forwardwise) is clearly evident on the original four running tires 11 through 14. This clearly establishes the principle of precluding cross remounting and leaves the spare tire 15 as the alternate for substitution to either the left or right side of the vehicle 10 prior to or after recapping in the manner earlier described by suitably obliterating or altering one or the other of the indicia portion 18, 19 of the indicia means 17 associated therewith.

In all of the embodiments thus far described a radial tire is mounted (or remounted) upon a vehicle such that the indicia means indicates only the actual direction of initial rotation of the tire as viewed from the side of the vehicle upon which the tire is mounted (or remounted) whereby the known initial direction of rotation remains known for the lifetime of the tire irrespective of multiple mountings and/or remountings thereof. Furthermore, depending upon the particular indicia on the factory original tires, the mounting step earlier alluded to may include an alteration of the indicia means to indicate only the actual direction of rotation of the tire or may exclude any such alteration, and thus both alternatives are available as was described specifically in regard to the uni-directional indications of rotations in embodiment three of this disclosure and which is equally applicable to the embodiment of FIGS. 3 and 4 which are to be described more fully hereinafter.

Referring specifically to FIG. 3, a tire 20 which is, of course, a radial tire, includes a side wall 21 having indicia means 22 thereon. The indicia means 22 include the letters C C W which are identified by reference numerals 23, 24 and 25, respectively. As in the case of the indicia means 17 the indicia means 22 are preferably raised, as opposed to being recessed, in order that the same may be more readily altered by an abrading, cutting or like process.

Considering a further embodiment of this invention, the vehicle 10 in lieu of the radial tires 11 through 15 could be provided with four running radial tires corresponding to the tire 20 and another tire as a spare also corresponding to the tire 20. Those of the tires 20 placed upon the left side of the vehicle 10 as viewed from the left along the side lines A, C would properly bear the total indicia 22 including all four letters C C W 23 through 25, respectively. The C C W refers to counterclockwise rotation in a FORWARD direction and therefore accurately represents the direction of rotation of the two tires on the left side of the vehicle 10. Two tires identical to the tire 20 if placed upon the right side of the vehicle 10 in lieu of the tires 12, 14 would inaccurately represent the direction of rotation unless, of course, the first C 23 or the second C 24 were obliterated. Thus when so originally mounted the indicia means 22 would be changed by buffing or the like to remove one of the elements 23, 24 so that the indicia 22 then read CW or C W represented by the reference characters 24, 25 or 23, 25, respectively. In either of the latter two instances the CW or the C W would indicate clockwise rotation, again as viewed along the sight lines B, D of FIG. 1.

Figure 1:
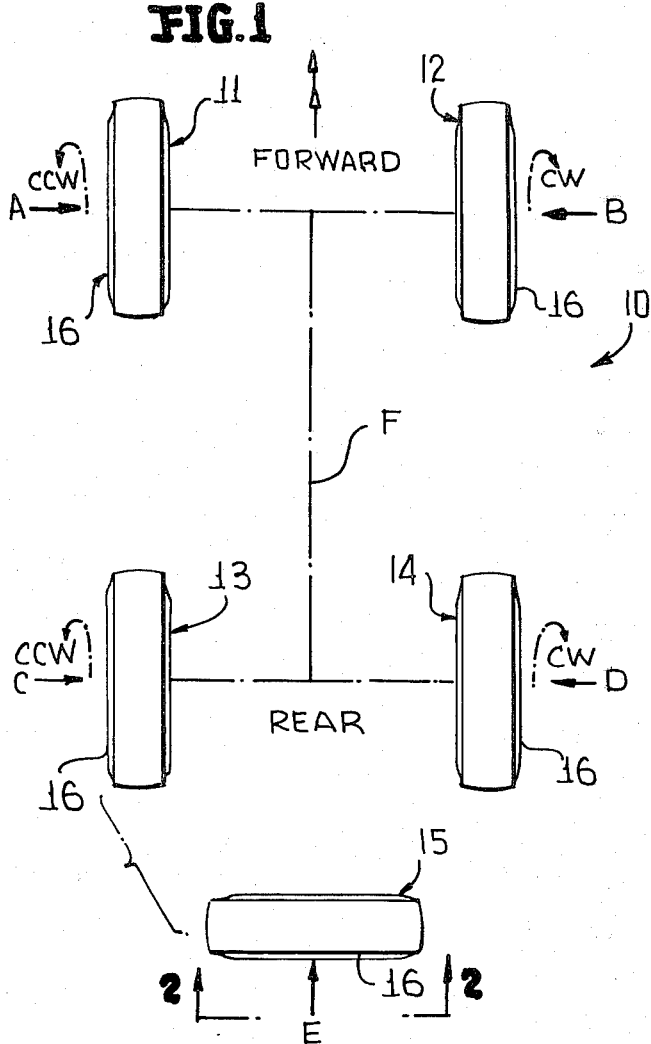
FIG. 1 is a highly diagrammatic top plan view of a vehicle and illustrates front and rear radial tires and a spare with the forward direction of rotation of the tires being indicated as clockwise on the right and counterclockwise on the left relative to the forward direction of travel as viewed from the respective right and left hand sides of the vehicle.

In keeping with this embodiment of the invention, it would have to be kept in mind that the tire 20 which is maintained as a substitute for the spare tire 15 of FIG. 1 would have thereon the total elements 23 through 25 of the indicia means 22. However, since the spare was never used the notation CCW is theoretically incorrect but since unused a comparison of the spare tire 20 as compared to any of the used running tires readily indicates the non-use of the spare tire 20, the fact that the CCW or the complete indicia defined by elements 23 through 25 is meaningless and alteration and/or unalteration of the indicia means 22 of the spare tire will therefore be a factor considered when the spare is substituted for the running tires depending, of course, as to the particular side of the vehicle the spare tire is to be mounted. If the spare tire is to be mounted on the left-hand side of the vehicle 10, all three portions 23 through 25 of the indicia means 22 would be retained whereas the substitution of the spare tire 20 for the front or rear tire on the right side of the vehicle 10 as sighted along the view lines B, D would require the obliteration of either the element 23 or the element 24 of the overall indicia means 22.

Reference is now made to FIG. 4 wherein reference numerals have been applied thereto identical to those shown in FIG. 3 except reference numeral 25 has been eliminated along with the structure associated therewith, and the remaining reference numerals have been primed. The description of the tire as it relates to the vehicle 10 and the method heretofore described is equal to that of the tire 20 except that the letters C C of the indicia means 22 stand for the word counterclockwise (without the W of FIG. 3), and upon one of the two C's being removed the remaining C (23' or 24') stands for the word clockwise.

Referring to FIG. 5 of the drawings, another tire 30 of a radial construction having a side wall 31 carries thereon the letters L, R, indicated by the reference numerals 32, 33, respectively. The function of the indicia means 32, 33 which is collectively designated by the reference character 34 is identical to that of the indicia means 17, 22 and 22' except that in lieu of referring to a direction of rotation relative to forward motion of the vehicle 10 the letter L32 represents mounting upon the left-hand side of the vehicle 10 as viewed along the view lines A, C whereas the letter R33 represents the mounting of the tire 30 upon the right side of the vehicle as viewed along the lines of the sight B, D. Hence if the tire 30 were substituted for either of the tires 11, 13 the R33 would be obliterated to indicate present and future mounting of the tire 30 upon the left-hand side of the vehicle 10 whereas the L32 would be obliterated for right-side mounting, again as these points of reference apply to the vehicle 10 as shown in FIG. 1.

Though the invention has been heretofore described in conjunction with remounting tires such that the indicia means are always exteriorly visible along the sight lines A through D, in further keeping with this invention the indicia means may as well be at the inboard side of anyone or all tires. For example, assuming the tire 12 which is on the right front of the automobile in FIG. 1 has indicia indicating clockwise rotation, this tire if mounted or remounted on the left front with the indicia inboard would still rotate directionwise clockwise. Accordingly, the invention is not to be limited as to the indicia means being visible only on outboard sides of the tires associated with the automobile, but also if mounted with the indicia inboard thereof.

While preferred forms and arrangement of parts have been shown in illustrating the invention, it is to be clearly understood that various changes in details and arrangement of parts may be made without departing from the scope and spirit of this disclosure.

I claim:
1. A method of maintaining proper rotational characteristics of a radial tire comprising the steps of providing a radial tire having upon at least one side wall thereof indicia means capable of indicating both potential clockwise and counterclockwise rotation of the tire as viewed from the side of the vehicle upon which the tire is adapted to be mounted, mounting the tire upon a vehicle, said mounting step includes an alteration of said indicia means such that the indicia means indicates only the actual direction of rotation of the tire as viewed from the side of the vehicle upon which the tire is mounted whereby the initial direction of rotation of the tire will remain known for the lifetime thereof irrespective of multiple mountings and/or demountings thereof.

2. The method as defined in claim 1 wherein the altering step is performed by the removal of at least a portion of the indicia means.

3. The method as defined in claim 1 wherein said indicia means are oppositely directed arrows.

4. The method as defined in claim 1 wherein said indicia means include at least the letters CC.

5. The method as defined in claim 1 wherein said indicia means include the letters L and R.

6. The method as defined in claim 2 wherein said indicia means are oppositely directed arrows.

7. The method as defined in claim 4 wherein said indicia means include at least the letters CC.

8. The method as defined in claim 2 wherein said indicia means include the letters L and R.

9. A method of maintaining proper rotational characteristics of a radial tire incident to a recapping operation comprising the steps of selecting a radial tire for recapping which is known to have rotated in an initial direction of rotation relative to an associated vehicle, said tire having upon at least one side wall thereof indicia means capable of indicating both potential clockwise and counterclockwise rotation of the tire as viewed from the side of the vehicle upon which the tire is adapted to be mounted, recapping the selected tire, and remounting the tire upon a vehicle, said remounting step includes an alteration of said indicia means such that the indicia means indicates only the initial direction of rotation of the tire as viewed from the side of the vehicle upon which the tire is mounted whereby the initial direction of rotation of the tire will remain known for the lifetime thereof irrespective of multiple mountings and/or demountings thereof.

10. The method as defined in claim 9 wherein said alteration step is performed prior to said recapping step.

11. The method as defined in claim 9 wherein said alteration step is performed prior to said remounting step.

12. The method as defined in claim 9 wherein said alteration step is performed after said selecting step and prior to said recapping step.

13. The method as defined in claim 1 wherein the indicia means indicating both potential clockwise and counterclockwise rotation of the tire are viewed from the side of the vehicle upon which the tire is adapted to be mounted.

14. The method as defined in claim 1 wherein the indicia means indicating both potential clockwise and counterclockwise rotation of the tire is as viewed from the inboard side of the vehicle tire toward the outboard side thereof.

* * * * *